United States Patent [19]

Saito et al.

[11] Patent Number: 4,805,500

[45] Date of Patent: Feb. 21, 1989

[54] HORIZONTAL BAND SAW MACHINE

[75] Inventors: Shuichi Saito; Hisao Kumazawa; Toru Tokiwa; Toshihisa Yoshishige, all of Kanagawa, Japan

[73] Assignee: Amada Company, Limited, Japan

[21] Appl. No.: 879,625

[22] Filed: Jun. 27, 1986

[30] Foreign Application Priority Data

| Jun. 29, 1985 | [JP] | Japan | 60-99593[U] |
| Jul. 2, 1985 | [JP] | Japan | 60-100056[U] |
| Jul. 5, 1985 | [JP] | Japan | 60-101711[U] |
| Jul. 5, 1985 | [JP] | Japan | 60-101712[U] |
| Jul. 5, 1985 | [JP] | Japan | 60-101713[U] |
| Jul. 9, 1985 | [JP] | Japan | 60-103510[U] |

[51] Int. Cl.[4] .............................. B23D 55/04
[52] U.S. Cl. ..................... 83/277; 83/168; 83/375; 83/390; 83/796; 83/800
[58] Field of Search ............... 83/277, 374, 375, 380, 83/388, 390, 168, 63, 72, 796–797, 800; 279/1 B, 89, 90, 94, 95, 104; 51/168, 377; 403/348, 349; 15/256.5, 21 D, 23

[56] References Cited

U.S. PATENT DOCUMENTS

| 2,620,605 | 12/1952 | Holford | 51/377 |
| 2,630,622 | 3/1953 | Beck | 83/796 X |
| 3,504,585 | 4/1970 | Harris | 83/277 |
| 3,754,490 | 8/1973 | Sata et al. | 83/277 |
| 4,046,041 | 9/1977 | Stolzer | 83/375 |
| 4,241,630 | 12/1980 | Moriya | 83/409 |
| 4,252,040 | 2/1981 | Kiefer | 83/277 |
| 4,481,849 | 11/1984 | Aoyagi | 83/63 |

Primary Examiner—Frank T. Yost
Assistant Examiner—Eugenia A. Jones
Attorney, Agent, or Firm—Wigman & Cohen

[57] ABSTRACT

A horizontal bandsaw has a main vise positioned slightly to the rear of the cutting location for gripping the workpiece during cutting, a material feed vise positioned to the rear of the main vise for feeding material into the cutting location, and a front vise positioned to the front of the cutting location. The front vise can move to a position to the rear of the cutting location to retrieve a small remnant of uncut material. The three vises each have a movable and a fixed jaw. A lower limit guide is provided on the main vise movable jaw which adjusts the descent of the cutting tool to the width of the workpiece. The fixed jaws are provided with means located within the operating area of the jaws for a slight advance or retraction of the contact face, to firmly grip the workpiece or to retract the contact face so as to prevent frictional contact with the workpiece. The movable jaws have a hydraulic cylinder built into a sliding tube for providing reciprocating motion. A moving position detection device is mounted on the material feed vise for determining the extent of longitudinal motion of the material feed vise so that the material feed vise can be positioned at a prescribed position. A laser beam head is mounted on the cutting head to verify accuracy of positioning of the workpiece. A rotating brush device has an easy mounting and dismounting construction.

3 Claims, 8 Drawing Sheets

HORIZONTAL BAND SAW MACHINE

BACKGROUND OF THE INVENTION

1. Field of the Invention

The present invention relates to a apparatus which cuts a piece of long material, such as, for example, a rod, and, in particular, to a cutting apparatus such as a horizontal bandsaw machine.

2. Description of the Related Art

A cutting apparatus such as a horizontal bandsaw machine for cutting a workpiece provided with a cutting head, which is freely movable in the vertical direction, equipped with a cutting tool such as a bandsaw and the like, is commonly known. In addition, a main vise device is provided, having a fixed vise jaw and a movable vise jaw for grasping the workpiece in an immovable state when a workpiece is cut with this cutting tool. In addition, the cutting apparatus has a feed material vise device which, similar to the main vise device, has a fixed vise jaw and a movable vise jaw, and grasps the workpiece between these vise jaws. The feed material vise device is capable of freely reciprocating movement in the longitudinal (front-to-rear) direction to feed the material. The main vise device is positioned in a rear location slightly separated from the position where the workpiece is cut by the cutting tool. The feeding vise device is generally positioned at the rear of the main vise device.

Generally, in the above configuration, when the fixed vise jaw and the movable vise jaw in the main vise device grasp and hold a workpiece, the cutting head moves down from its raised position to cut the workpiece with a cutting tool of the cutting head. When the cutting head reaches the lower most position to complete the cutting, the cutting head is automatically moved back to the original raised position. Then, the workpiece is released from holding by the fixed vise jaw and the movable vise jaw in the main vise device, and the material feed vise device grasping the workpiece in a predetermined retreat position advances and approaches as close as possible to the main vise device, and feeds the workpiece in a fixed dimension unit. When the material feed vise device reaches the advance end position and is at its closest to the main vise device, the workpiece is once again grasped and secured by the fixed and movable vise jaws on the main vise device. In this way, after the workpiece has once again been grasped and secured by the main vise device, the grasp of the workpiece by the fixed and movable vise jaws of the material feed vise device is released, and the material feed vise device once more retreats to a set position. In this retreat position, the material feed vise device once more grasps the workpiece, and remains in the state in which it is capable of performing the next feed action. As outlined above, the workpiece is now once again securely grasped by the main vise device, and, once the material feed vise device has returned to the previously set retreat position, the cutting head once again descends, and once again cuts the workpiece with the cutting tool.

By repetition of the above type of action, the cutting of a long workpiece into fixed dimension units is progressively carried out. After the workpiece is repeatedly cut in this manner, the material feed vise device in the retreat position grasps the rear end of the workpiece, and after the final material feed action and cutting of the workpiece has been carried out, the dimension from the cutting position to the rear end of the workpiece is of a length which can no longer be fed, so a remnant remains.

Accordingly, if the dimension of the remnant material is R and the fixed dimension of the cut length is T, when the final material feed action has been carried out by the material feed vise device and the length L of the workpiece has the relationship $L > T + R$, it is still possible to feed the material at a fixed dimension. However, when $L < T + R$, it is not possible to feed forward by the fixed dimension cut length T from the cutting position of the cutting apparatus, and a remnant material of dimension L produced is longer than the fixed dimension cut length T. This results in a large amount of waste.

In addition, as outlined above, the material feed vise device moves reciprocatingly in the longitudinal direction to feed the workpiece, the fixed vise jaw on the material feed vise device contacts the workpiece, resulting in a large frictional resistance. In addition, damage to the workpiece can easily result Specifically, the fixed vise jaw on the material feed vise device is secured in a fixed position, and when the materials feed vise device retreats from the advance position, the fixed vise jaw contacts the side surface of the workpiece. Accordingly, a material feed vise device provided with a fixed vise jaw which can be moved slightly in the direction away from the workpiece has been developed to avoid this contact between the fixed vise jaw and the workpiece.

However, a hydraulic cylinder for slightly separating the fixed vise jaw from the workpiece is conventionally provided on the outside of the fixed vise jaw. Accordingly, the fixed vise jaw and this hydraulic cylinder are positioned in series and the overall structure is comparatively large, giving rise to the problem that the piping for the hydraulic cylinder is externally exposed, and in addition to worsening the outward appearance, damage to the unit from external sources readily occurs.

Further, when the workpiece is being grasped by the fixed and movable vise jaws of the material feed vise device, a large stroke is provided for the hydraulic cylinder handling the reciprocating movement of the movable vise jaw to allow it to conform to a variety of workieces in larger sizes. In this type of hydraulic cylinder, with the configuration where the movable vise jaw is mounted on the body of the cylinder, the reciprocating configuration is such that the body of the cylinder is guided by a guide section which is formed on the material feed vise device. Accordingly, in the case where it is desired to improve the rigidity of the overall configuration of the movable vise jaw side, the cylinder body must be made wide and large, and changes must also be made to the piston and piston rods.

In addition, in conventional devices, a configuration which positions the material feed vise device toward the retreat position comprises a positioning stopper which freely adjusts the position in the longitudinal direction. The configuration is such that the material feed vise device touches against the positioning stopper. The mechanism for positioning the positioning stopper in the longitudinal direction comprises a rotating threaded rod, extending in the longitudinal direction, which causes the positioning stopper to move in the longitudinal direction. In addition, the positioning stopper is positioned n the longitudinal direction by reading the number of revolutions of a counter which is linked to a threaded rod through a plurality of gears.

Accordingly, in the conventional device, backlash exists between the threaded rod and the positioning stopper, and between the plurality of gears which link the threaded rod and the counter, which causes a problem relative to the improvement of the dimensional accuracy of the fixed dimension material to be fed.

In addition, in a conventional cutting apparatus which has a particularly large sized structure, a sub guide post is provided in addition to a main guide post for guiding the cutting head freely in the vertical direction. This sub guide post and the main vise device are provided in parallel, in the longitudinal direction. Accordingly, when the material feed vise device is closest to the main vice device, the sub guide post is between the main vice device and the material feed vise device, which gives rise to the problem that the remnant material length becomes large by the size of the sub guide.

In addition, with a cutting apparatus where the cutting head rotates horizontally for cutting diagonally to the longitudinal direction of the workpiece, the angle of rotation cannot be larger due to the existence of the sub guide post by its size.

Furthermore, in a large type of cutting apparatus, because the sub guide post is erected on the base on which is mounted the main vise device, this base must be large, and with a large base there is the problem that machining of the mounting seat for the sub guide post to be erected is difficult.

In addition, in conventional cutting apparatus where the sawblade as a cutting tool is tilted, the lower limiting position of the cutting head is always fixed. Accordingly, depending on the magnitude of the width of the cut workpiece, even after the cutting of the workpiece is completed, the cutting head continues to descend, and descends more than necessary, so that raising the efficiency of the operation is a problem.

In addition, in a cutting apparatus such as a horizontal bandsaw machine, a rotating brush is provided to brush off the chips which adhere to the bandsaw used as a cutting tool. Because this rotating brush is an expendable item, it must be replaced periodically. Accordingly, a threaded section is conventionally formed at the tip of the rotating shaft on which the rotating brush is mounted. Therefore, replacement of the rotating brush requires its removal from and remounting on the rotating shaft by the removal and installation of a nut on this threaded section. For this reason, a tool is required to rotate a conventional nut, and occasionally the tool or the nut is lost. In addition, there is also the problem that the removal and reinstallation of the rotating brush takes a comparatively long time.

SUMMARY OF THE INVENTION

A first object of the present invention is to provide, with due consideration to the drawbacks of such conventional devices, a new type of cutting apparatus with which it is possible to feed a fixed length of workpiece in the case where the remnant length is greater than the length of the product, even in the case where the workpiece remnant has become so short that it is almost impossible to feed the workpiece by the material feed vise device.

In order to accomplish this first object of the present invention, a front vise device which is freely movable in the longitudinal direction is provided at a position in front of a main vise which is positioned close to the rear side of the cutting apparatus. This front vise device can go past the cutting position to approach the main vise device.

A second object of the present invention is to provide a new type of cutting apparatus in which the overall structure of the fixed vise jaw section in the main vise device and the material feed vise device can be kept small, with a good external appearance, and the circuit which activates the fixed vise jaw is not exposed.

In order to accomplish this swecond object of the present invention, a hydraulic cylinder is positioned within the operation region of the fixed vise jaw in order to activate the fixed vise jaw.

A third object of the present invention is to provide a new type of cutting apparatus in which it is possible to easily improve the rigidity in the case where the rigidity of the overall structure of the movable vise jaw for the material feed vise device in the cutting apparatus needs improving.

In order to accomplish this third object of the present invention, a sliding tube is slidably provided at a guide section formed on the vise bed on the material feed vise device. A movable vise jaw is mounted on this sliding tube, and a hydraulic cylinder is built into the sliding tube to provide reciprocating action for this sliding tube.

A fourth object of the present invention is to provide a new type of cutting apparatus in which, when the workpiece is fed by the material feed vise device, the transfer position of the material feed vise device is detected, and a correct fixed dimension material feed action is obtained.

In order to accomplish this fourth object of the present invention, a rack is provided, extending over the moving range of the material feed vise device, and a pinion gear is biased toward this rack to eliminate bar crash in a position detection device, which is provided in a freely rotatable manner on the material feed vise device for detecting the transfer position of the material feed vise device.

A fifth object of the present invention is to provide a new type of cutting apparatus in which, where a sub guide post is provided for guiding the, vertical movement of the cutting head, the machining of the mounting seat for erecting the side guide post is simple, and, even when a sub guide post is provided, the material feed vise device can approach closely to the main vise device.

In order to accomplish this fifth object of the present invention, a sub guide post is erected on the vise bed for the main vise device, and a hydraulic cylinder is mounted on this sub guide post to activate the movable vise jaw.

A sixth object of the present invention is to provide a new type of cutting apparatus in which the descended position of a cutting head corresponds to the width of the cut workpiece and is automatically modified.

In order to accomplish this sixth object of the present invention, on one side of either the cutting head or the base, a lower limit detection device is provided, and on the other side, at a preset height, a lower limit setting device is provided by which the lower limit detection device is activated to regulate the lower limit detection device. The position at which the lower limit detection device is activated by the lower limit setting device is coupled to the action of the movable vise jaw on the main vise device, making a modification in the vertical direction possible.

A seventh object of the present invention is to provide a new type of cutting apparatus in which it is easy, without the use of tools, to quickly mount and dismount a rotating brush for removing the chips adhering to a cutting tool provided on the cutting head.

In order to accomplish this seventh object of the present invention, a flange section is provided at the tip of a rotating shaft on which a rotating brush is mounted, and an L-shaped contact or stop member is provided on one side surface of this rotating flange. The configuration is such that a separation of the contact member from the flange section is obtained only at a designated position on the flange section.

BRIEF DESCRIPTION OF THE DRAWINGS

These and other objects, features and advantages of the present invention will become more apparent from the following description of a preferred embodiment taken in conjunction with the accompanying drawings, in which.

DESCRIPTION OF THE PREFERRED EMBODIMENTS

Figure 1:
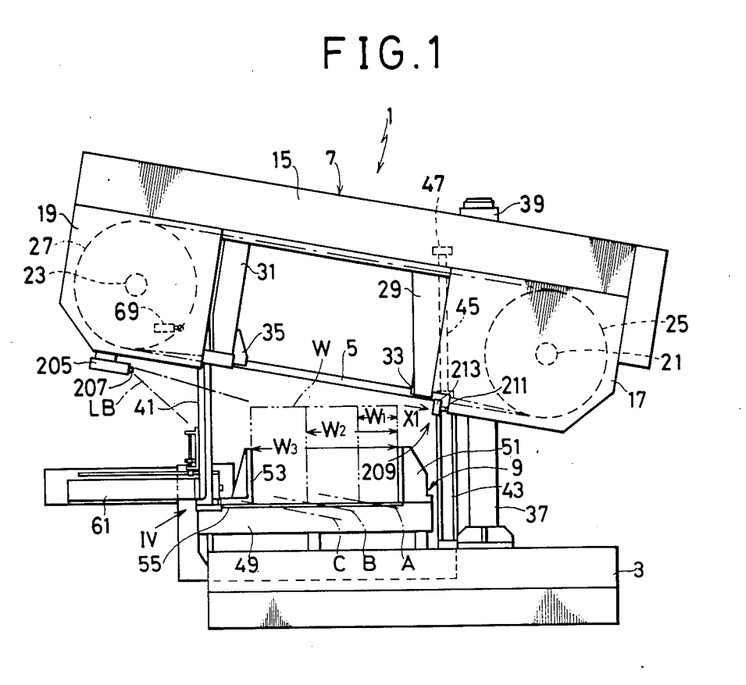
FIG. 1 is a front elevation of a horizontal bandsaw machine as an embodiment of a cutting apparatus of the present invention corresponding to a sectional drawing viewed along the line I—I in FIG. 2.
Figure 2:
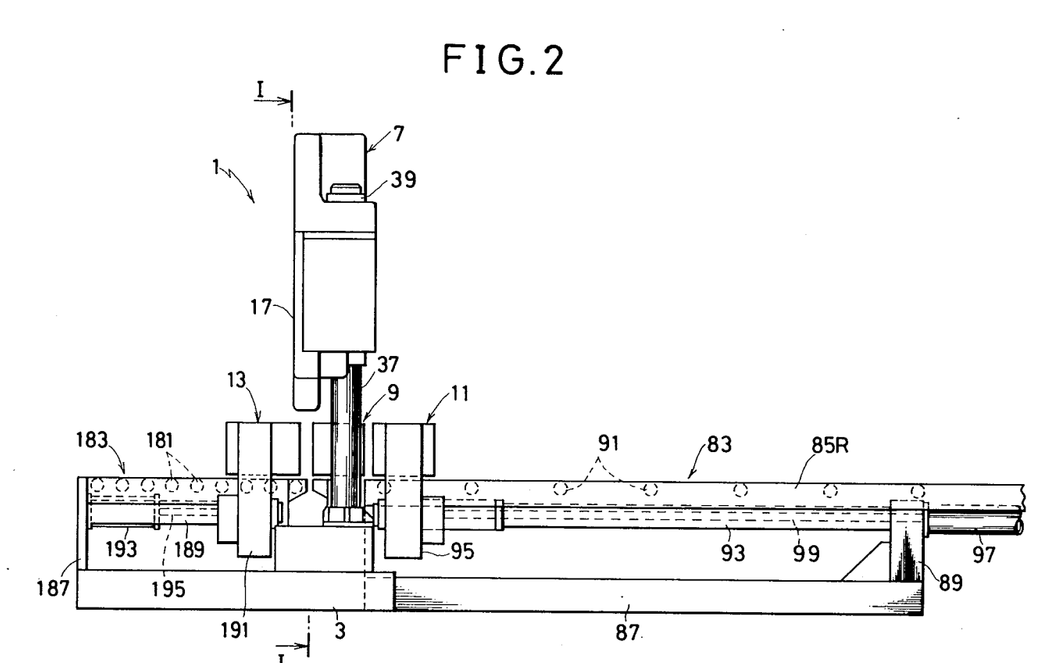
FIG. 2 is a right side elevation of the horizontal bandsaw machine as an embodiment of the present invention.
Figure 3:
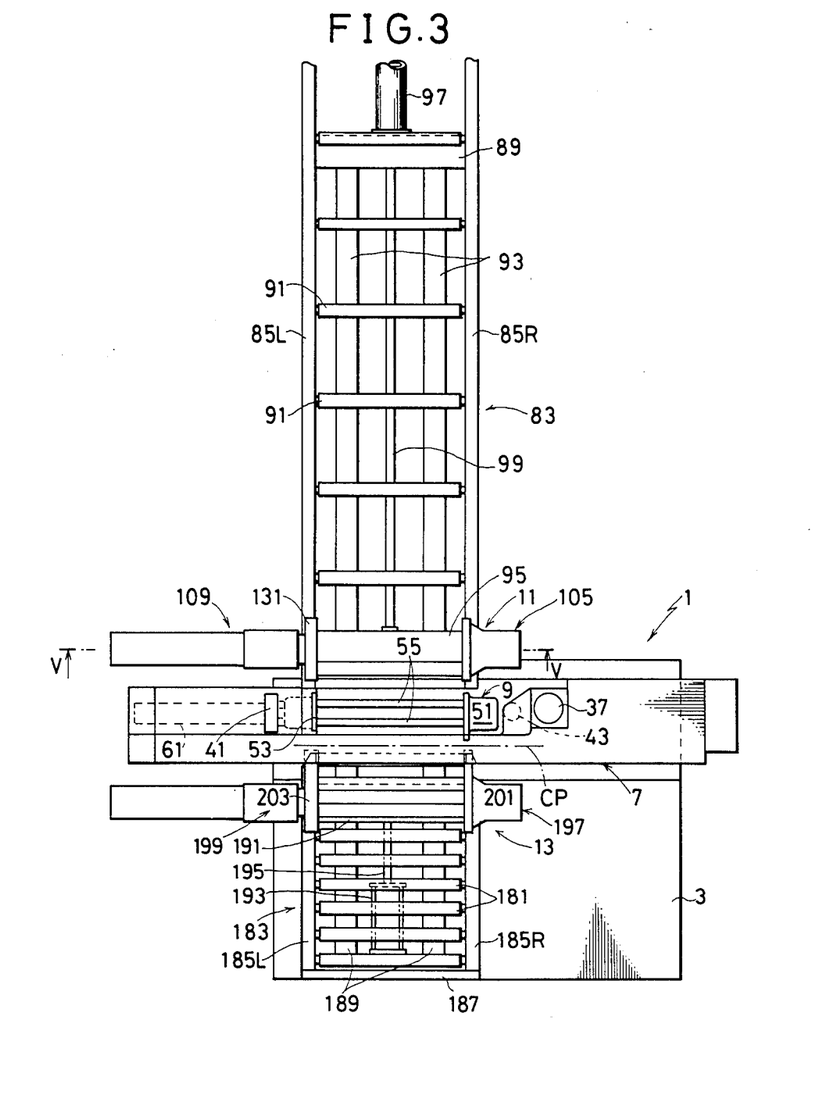
FIG. 3 is a plan view, viewed from the top of FIG. 1.

Now referring to FIG. 1 to FIG. 3, these drawings show a horizontal bandsaw machine 1 as a cutting apparatus for cutting various types of long workpieces W such as, for example, a rod or an H-shaped steel bar.

The horizontal bandsaw machine 1 is provided with a box-shaped base 3. A cutting head 7 which is provided with a cutting tool 5 for cutting a workpiece W on the base 3 is provided with freely vertical movement. In addition, a main vise device 9 for securely grasping the workpiece W in an immobile state, is provided at a position adjacent to a cutting position CP where the workpiece W is cut by means of the cutting tool 5. A material feed vise device 11 for feeding the workpiece W is provided at a rear position of the main vise device 9, with freely reciprocating movement in the longitudinal direction relative to the main vise device 9. Further, a front vise device 13 is provided, with freely reciprocating movement in the longitudinal direction, at a front position of the main vise device 9, for transporting the product cut from the workpiece W in the forward direction, and for drawing out a short remnant of material from the main vise device 9 in the forward direction.

More specifically, the cutting head 7, as is better shown in FIG. 1, is formed in a C-shape and provided with a pair of respective wheel housings 17, 19 on both right and left sides of a beam member 15 which inclines in the right downward direction. A driving wheel 25 and a driven wheel 27 in the wheel housing 17, 19, are provided in a freely rotatable manner through respective shafts 21, 23. An endless bandsaw blade, as the cutting tool 5, runs between the driving wheel 25 and the driven wheel 27. A pair of sawblade guides 29, 31 are provided on the beam member 15 so that the tips of the teeth of the bandsaw blade 5 are pointed vertically downward. The sawblade guides 29, 31, by means of a guide block 33 and a guide block 35 provided on their respective lower ends, guide the sawblade 5 by twisting upward. One part of the sawblade guide 31 is provided so that its position can be freely adjusted in the lateral (left-to-right) direction, so that it can correspond to the width of the cut workpiece W.

By means of the above configuration, the driving wheel 25 aan be suitably driven, causing the travel of the bandsaw blade 5. This bandsaw blade 5 is guided in the upwardly twisted status by the sawblade guides 29, 31 and the guide blocks 33, 35, so that the workpiece W positioned below the bandsaw blade 5 is cut on the descent of the cutting head 7.

A main guide post 37 is erected perpendicularly on the base 3 to guide the cutting head 7 vertically. The main guide post 37 is fitted in a freely slidable manner into a guide sleeve 39 provided perpendicularly on one side of the cutting head 7. In addition, a sub guide post 41, which guides the other side of the cutting head 7 perpendicularly, is provided perpendicularly in a position suitably separated from the main guide post 37. This sub guide post 41, as will be later explained, is erected on a vise bed on the main vise device 9. The mechanism by which the sub guide post 41 guides the cutting head 7 perpendicularly is a commonly known structure, so a detailed explanation of this guide mechanism will be omitted here.

In order for the cutting head 7 to move vertically and be guided by the main guide post 37 and the sub guide post 41, an elevating cylinder device 43 is erected on the base 3. The tip of a piston rod 45 vertically movably provided on the elevating cylinder device 43 is connected to a bracket 47 provided on the cutting head 7. Accordingly, when an operating fluid is supplied to the elevating cylinder device 43, causing the the piston rod 45 to project, the cutting head 7 is elevated, so that when the activating fluid is discharged from the elevating cylinder device 43, the cutting head 7 automatically descends.

When the cutting head 7 descends from its elevated position and cuts the workpiece W, the main vise device 9 for securely grasping the workpiece W in an immobile state is provided on the rear side adjacent to the cutting position CP where the workpiece W is cut by the cutting todl 5.

Specifically, a vise bed 49 on the main vise device 9 is mounted on the base 3 on the rear side of a perpendicular flat surface, on which the cutting tool 5 moves vertically through the vertical movement of the cutting head 7. A fixed vise jaw 51 is installed on one side of the upper surface of the vise bed 49. A movable vise jaw 53 which works in concert with the fixed vise jaw 51 to securely grasp the workpiece W is supported on the other side of the vise bed 49 so that it is freely movable in the lateral direction. The movable vise jaw 53 is guided in the lateral direction, in the same way as for a usual vise device, by a pair of guide plates 55 which are provided in a separated manner in the longitudinal direction on the top surface of the vise device 49.

Figure 4A:
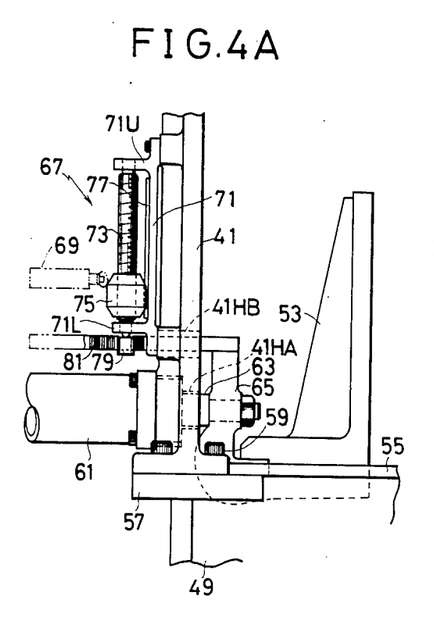
FIG. 4A is a front elevation illustrating an expanded view of the main portion only of the horizontal bandsaw machine viewed in the direction of the arrow IV in FIG. 1.

As shown in FIG. 4, a guide post mounting seat 57 is installed on the other side of the upper surface of the vise bed 49. The sub guide post 41 is erected perpendicularly on the guide post mounting seat 57, using a plurality of bolts 59. A hydraulic cylinder 61 for moving the movable vise jaw 53 in a reciprocating manner in the lateral direction is mounted on the sub guide post 41. A piston rod 63 which is provided to move in a freely reciprocating manner in the hydraulic cylinder 61, penetrates a first through hole 41HA which penetrates the sub guide post 41 horizontally. The tip of the piston rod 63 is connected to an inverted L-shaped bracket 65 mounted integrally on the movable vise jaw 53.

By means of the above configuration, the fact that the movable vise jaw 53 is moved in a reciprocating manner in the lateral direction by the action of the hydraulic cylinder 61 is readily understood. In addition, because the guide post mounting seat 57 is installed on the vise bed 49, the guide post mounting seat 57 can be machined at the same time as the vise bed 49, making the machining of the guide post mounting seat 57 an easy operation. Further, both the sub guide post 41 and the hydraulic cylinder device 43 are positioned identically on a perpendicular surface, and the material feed vise device, which will be later explained, can be positioned very close to the main vise device 9.

Now, with further reference to FIG. 4, on the sub guide post 41, a lower limit setting device 67, which sets the lower limit of the cutting head 7, is provided, corresponding to the width of the cut workpiece W. The lower limit setting device 67 activates a suitable lower limit detection device 69, such as a limit switch or proximity switch, provided on the cutting head 7, and is used to regulate the lower limit of the cutting head 7.

Specifically, a bearing bracket 71 on which is provided a plurality of bearng sections 71U, 71L, is integrally mounted on a vertical section on one side of the sub guide post 41 by the use of bolts or the like. A threaded rod 73 is supported perpendicularly in a freely rotatable manner between the vertical bearing sections 71U, 71L. A nut member 75 which activates the lower limit detection device 69 is screwed onto the threaded rod 73 so that it is freely movable in the vertical direction. The rotation of the nut member 75 is regulated by contact with a guide key 77 provided on the bearing bracket 71. A pinion gear 79 is provided on the lower end of the threaded rod 73. The pinion gear 79 engages a rack 81 which extends in the lateral direction. The rack 81 penetrates a second through hole 41HB, which is provided horizontally on the sub guide post 41, and this rack 81 is connected to the bracket 65.

As a result of the above configuration, the threaded rod 73 is suitably rotated through the rack 81 and pinion gear 79 in a manner linked to the reciprocating motion of the movable vise jaw 53 by the action of the hydraulic cylinder 61, so that the nut member 75 is moved vertically. In this embodiment of the present invention, when the movable vise jaw 53 is moved to the right in FIG. 1 and FIG. 4, the nut member 75 is moved in the upward direction. Specifically, as the width of the cut workpiece W becomes smaller the nut member 75 is moved to the upper side, and the lower limit detection device 69 is activated in a higher position.

In other words, as shown in FIG. 1, with the width of the workpiece W as W1, when the cutting tool 5 descends to position A, the lower limit detection device 69 is activated by the nut member 75. The descent of the cutting head 7 is halted by the action of the lower limit direction device 69, after which it returns automatically to its original elevated position. In the same way, when the width of the workpiece W is W2, the lower limit of the cutting head 7 is regulated at B position, and when the width is W3, at C position. Specifically, the lower position of the cutting head 7 is regulated to correspond to the cut width of the workpiece W, and the cutting head is preventing from descending any lower than necessary, which improves the efficiency of the cutting action.

Incidentally, in this embodiment of the present invention, the explanation was given of a configuration wherein the nut member 75 moves vertically, linked to the movable vise jaw 53. However, it is possible to have a configuration wherein the lower limit detection device 69 moves relatively vertically, linked to the sawblade guide 31. Specifically, there are many configurations possible for the mechanism which adjusts the lower limit of the cutting head 7, conforming to the cut width of the workpiece W.

Figure 4B:
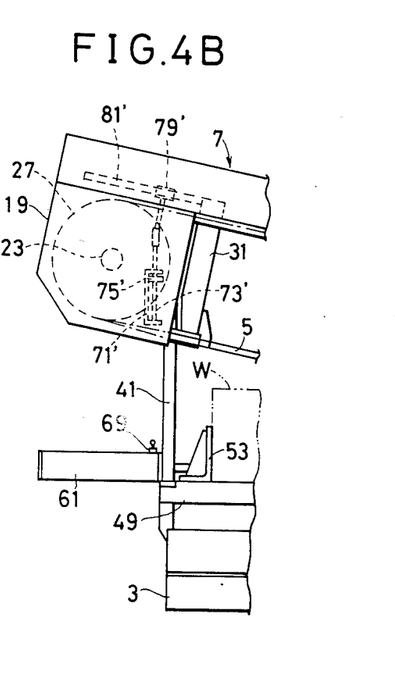
FIG. 4B is a front elevational view illustrating the main portion of a modification of the embodiment of FIG. 4A.

As an example of a variation of the mechanism which adjusts the lower limit of the cutting head 7, as shown in FIG. 4B, a bearing bracket 71', corresponding to the bearing bracket 71, is mounted on the housing 19. A threaded rod 73' corresponding to the threaded rod 73 is supported in a freely rotatable manner on the bracket 71', and a nut member 75' corresponding to the nut member 75 is screwed onto the threaded rod 73' in a manner which allows free vertical movement. Further, a pinion gear 79' corresponding to the pinion gear 79 is linked to the threaded rod 73' through a universal joint or the like. In addition, a rack 81' corresponding to the rack 81 is linked to the sawblade guide 31, and the pinion gear 79' engages the rack 81'. Then, the lower limit detection device 69 is positioned below the nut member 75'.

With the above configuration, when the sawblade guide 31 moves in the downward direction corresponding to the cut width of the workpiece W, the threaded rod 73' is rotated through the rack 81' and the pinion gear 79', and the nut member 75' is adjusted in the vertical direction. The lower limit of the cutting head 7 is therefore adjusted corresponding to the cut width of the workpiece W.

In another possible variation of this embodiment of the present invention, a perpendicular cylindrical cam is provided which is rotated, linked to the rack 81. The lower limit detection device 69 contacts a cam section formed on the top of the cylindrical cam.

In still another possible variation of this embodiment of the present invention, the rack 81 is replaced by a plate cam the top surface of which slopes to the lower right. The plate cam is mounted on the bracket 65, and the lower limit detection device 69 contacts the sloped cam section on the top surface of the plate cam.

In still another possible variation of this embodiment of the present invention, a pair of pulleys or a pair of chain sprockets are separated in the vertical direction and mounted on the sub guide post. A dog is mounted on an endless chain or on an endless belt which runs between the pulleys or chain sprockets. Then one of the pulleys rr chain sprockets is rotated by the rack 81, and the dog contacts the lower limit detection device 69.

In still another possible variation of this embodiment of the present invention, an adjusting cylinder is vertically positioned below the lower limit detection device 69, and when the movable vise jaw 53 moves in the lateral direction, one part or all of the operating fluid discharged from the hydraulic cylinder 61 flows into the adjusting cylinder. Then, the piston rod of the adjusting cylinder moves vertically in an magnitude corresponding to the position to which the movable vise jaw 53 moves, so that the lower limit detection device 69 contacts the piston rod.

Now referring to FIG. 2 and FIG. 3, a roller conveyor 83, on which the workpiece W is supported, is provided at the rear position of the main vise device 9. The front ends of a pair of lateral frames 85R, 85L on the roller conveyor 83 are supported on the base 3 in a position adjacent to the main vise device 9. In addition, the rear sides of the frames 85R, 85L are supported on a stand 89 which is erected on a base plate 87 positioned on the rear side of the base 3. A plurality of support rollers 91 are provided on which the workpiece W is supported, and these support rollers 91 are, in turn, supported in a freely rotatable manner between the lateral frames 85R, 85L.

A pair of guide bars 93, which extend in the longitudinal direction, are positioned below the support rollers 91. The front end of each of the guide bars 93 is supported on the base 3, and the rear end is supported on the stand 89. A vise bed 95 on the material feed vise device 11 is supported in a freely slidable manner on the guide bars 93. In addition, a material feed cylinder 97, for moving the material feed vise device 11 in the rear direction, is provided below the support rollers 91. Specifically, the material feed cylinder 97 extends rearward and is supported on the stand 89. The tip of a piston rod 99, which is provided on the material feed cylinder 97 in a manner which allows freely reciprocating motion, is suitably connected to the vise head 95. Accordingly, the material feed cylinder 97 is suitably activated, so that from the reciprocating motion of the piston rod 99, the material feed vise device 11, following along the guide bar 93, moves in a reciprocating manner in the longitudinal direction.

Figure 5:
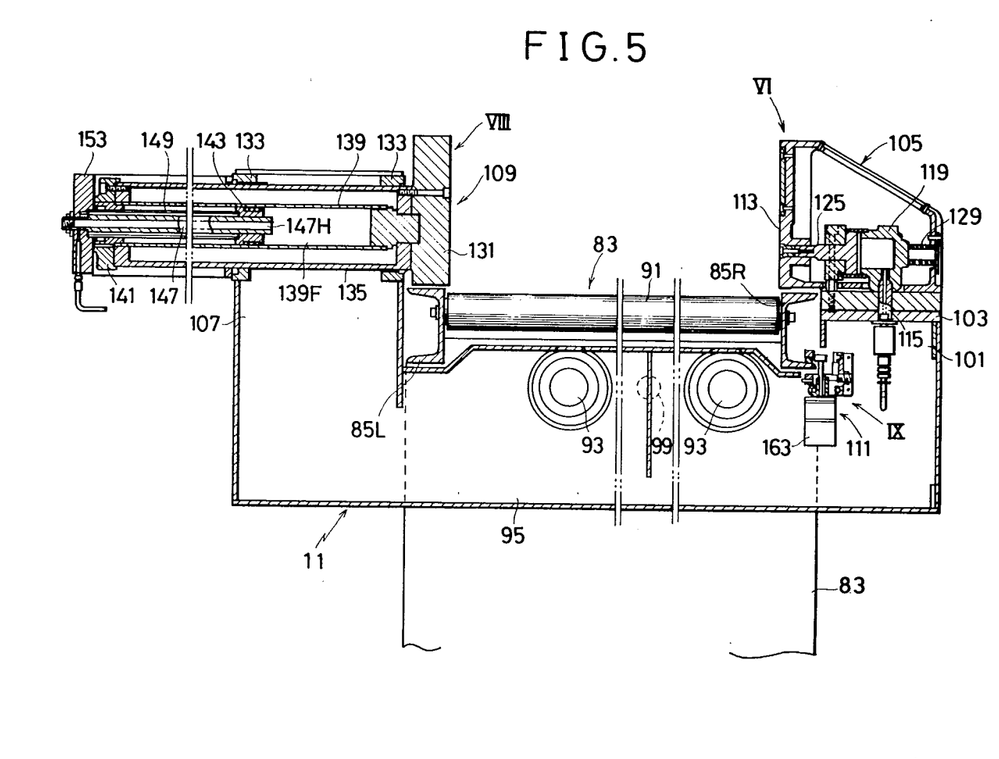
FIG. 5 is an enlarged sectional drawing viewed from along the line V—V in FIG. 3, showing the main portion only, with one portion omitted.

The material feed vise device 11 grasps the workpiece W on the roller conveyor 83 and feed it accurately by a prescribed dimension to the main vise device 9. Specifically, the vise bed 95 on the material feed vise device 11, as shown in FIG. 5, is built in a box shape from steel plate suitably welded, and extends in the lateral direction intersecting the roller conveyor 83. A projection section 101, which projects slightly upward, is formed at one end of the vise bed 95. A fixed vise assembly 105 is mounted on a mounting plate 103 which is welded onto the projection section 101. In addition, a standing section 107, which protrudes to a greater extent than the roller conveyor 83, is formed on the other end of the vise bed 95. A movable vise assembly 109, which works together with the fixed vise assembly 105 to grasp the workpiece W, is mounted on the standing section 107. Further, a moving position detection device 111, for detecting the moving position of the material feed vise device 11, is built into the vise bed 95.

Figure 6:
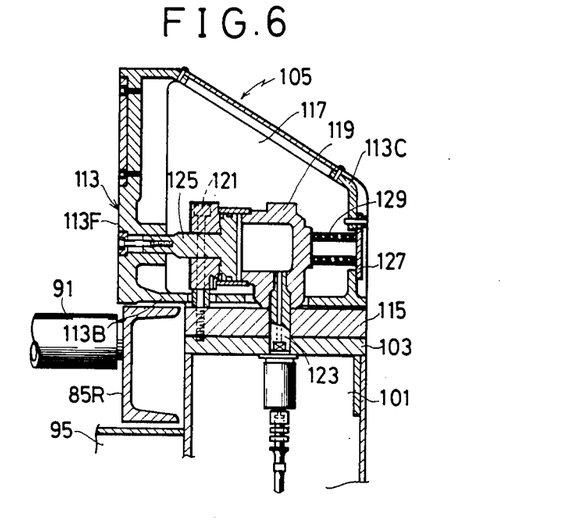
FIG. 6 is an enlarged sectional drawing viewed from along the line VI—VI in FIG. 5.
Figure 7:
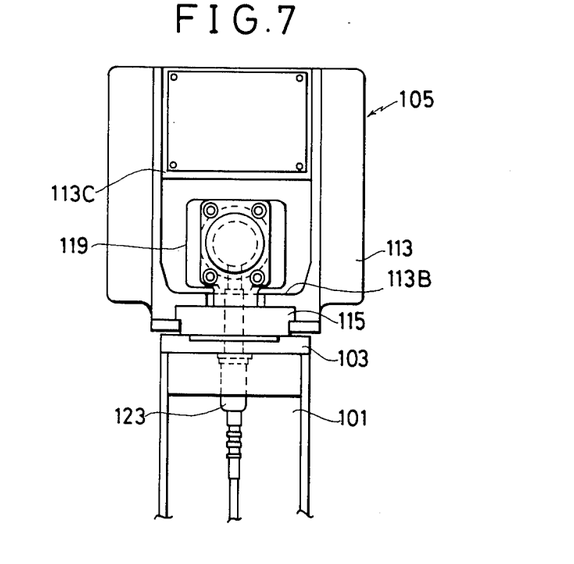
FIG. 7 is a right side elevation viewed from the right side of FIG. 6.

More specifically, as shown in detail in FIG. 6 and FIG. 7, a guide base 115, which has an approximate T shape in cross-section, is integrally installed on the mounting plate 103 so that a fixed vise jaw 113 on the fixed vice assembly can move in a slightly reciprocating manner in the direction of advance and retreat relative to the workpiece W. The fixed vise jaw 113 is supported in a movable manner on the guide base 115.

As shown in FIG. 6, the fixed vise jaw 113 is provided with a perpendicular contact surface 113F which contacts the workpiece W, and is also provided with a horizontal lower partition section 113B which is supportd in a freely slidable manner on the guide base 115. The fixed vise jaw 113 is constructed in a hollow form comprising a cover partition section 113C which connects the upper end of the contact surface 113F with the lower partition section 113B. A minicylinder 119, which slightly activates the fixed vise jaw 113, is built into a hollow section 117 of the fixed vise jaw 113. The minicylinder 119 is secured to the guide base 115 by means of a plurality of bolts 121 which penetrate a comparatively large hole formed in the lower partition section 113B of the fixed vise jaw 113. In addition, the minicylinder 119 is connected to a stand 123 in the form of a pipe which is securely erected on the guide base 115 to feed an operating fluid to the minicylinder 119. The fixed vise jaw 113 is suitably connected to a piston rod 125 which moves in a freely reciprocating manner within the minicylinder 119. In addition, a suitable return spring member 129, such as a coil spring or urethane rubber is compressedly installed between the minispring 119 and a spring seat plate 127 which is suitably installed on the cover partition section 113C, using bolts or the like.

With the above construction, the activating fluid is fed into the minicylinder 119, and, when the piston rod 125 prtrudes, the fixed vise jaw 113 is moved slightly to the left in FIG. 6, and the contact surface 113F contacts the workpiece W. In addition, when the activating fluid is discharged from the minicylinder 119, the fixed vise jaw 113 is returned to its original position by the action of the return spring member 129, and the contact surface 113F of the fixed vise jaw 113 is drawn away from the workpiece W.

Accordingly, when the workpiece W is grasped and the material feed action is performed, the activating fluid is fed into the minicylinder 119; When the material feed vise device 11 returns to the retreat position, the contact surface 113F of the fixed vise jaw 113 can be prevented fro rubbing against the workpiece W as a result of the discharge of the activating fluid from the minicylinder 119. In addition, because the minicylinder 119 is built into the hollow section 117 of the fixed vise jaw 113, the overall structure can be made compact, with a better external appearance, and the minicylinder 119 is not damaged from external factors.

Figure 8:
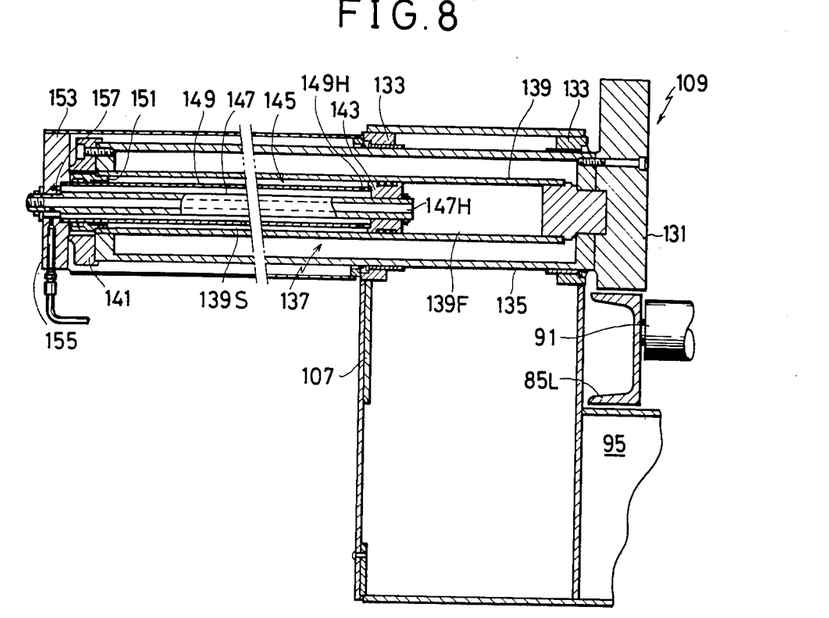
FIG. 8 is an enlarged sectional drawing viewed from along the line VIII—VIII in FIG. 5.

Now referring to FIG. 8, the movable vise assembly 109 on the material feed vise device 11 is provided with a movable vise jaw 131 which opposes the fixed vise jaw 113. The movable vise jaw 131 is integrally mounted with e.g. bolts on one end of a cylindrical sliding tube 135, which is supported in a freely sliding manner in the guide holes of a plurality of guide members 133 which are mounted on the standing section 107. A hydraulic cylinder 137 is built into the sliding tube 135 to provide reciprocating movement of the movable vise jaw 131.

Specifically, a cylinder body 139 connected to one end of the movable vise jaw 131 is provided in the sliding tube 135. The other end of the cylinder body 139 is integrally connected to the other end of the sliding tube 135 through a ring-shaped connecting member 141. A piston 143 penetrates into the cylinder body 139 in a freely slidable manner, and a piston rod 145 is connected to the piston 143. The piston rod 145 is constructed as a double tube structure made up of a first tube 147, which is penetrated at one end by the piston 143, and a second tube 149 which is suitably connected to one end of the piston 143 which surrounds the first tube 147. A ring-shaped seal member 151 which is secured to the connecting member 141 is slidingly interposed between the second tube 149 and the connecting member 141. The first tube 147, which is provided with a communicating hole 147H, feeds and discharges the activating fluid into a first chamber 139F of the cylinder body 139 which is divided by the piston 143. The second tube 149, which is provided with a communicating hole 149H, feeds and discharges the activating fluid into a second chamber 139S of the cylinder body 139. The other ends of the first tube 147 and the second tube 149 are respectively supported in an integral manner on an end holder 153. The communicating hole 147H of the first tube 147 communicates with a first port 155 formed in the end holder 153. The communicating hole 149H of the second tube 149 communicates with a second port 157 formed in the end holder 153.

The end holder 153 is separated from and opposed to one of the guide members 133. This one of the guide members 133 is integrally connected to the end holder 153 through a plurality of tie rode (omitted from the drawings). In other words, the end holder 153 is integrally supported by the one of the guide members 133 through a plurality of tie rods. Further, although a detailed drawing is omitted here, one tie rod among the plurality of tie rods mates with the connecting member 141 in freely slidable manner so that the sliding tube 135 etc. are unable to rotate.

As a result of this configuration, the cylinder body 139 is moved to the right in FIG. 8 by the feeding of operating fluid into the first chamber 139F of the cylinder body 139. Accordingly, the movable vise jaw 131 forces the workpiece W to the fixed vise jaw 113 to grasp it. In addition, the cylinder body 139 moves to the left in FIG. 8 when the operating fluid is fed to the second chamber 139S of the cylinder body 139, releasing the grasp of the movable vise jaw 131 on the workpiece W.

As previously explained, the reciprocating motion of the movable vise jaw 131 occurs from the activation of the hydraulic cylinder 137 when the sliding tube 135 is guided by the guide member 133. Accordingly, when it is necessary to improve the overall rigidity of the movable vise jaw 131, the thickness of the sliding tube 135 may be increased without the necessity of modifying the hydraulic cylinder 137 etc., so that rigidity is easily improved.

Figure 9:
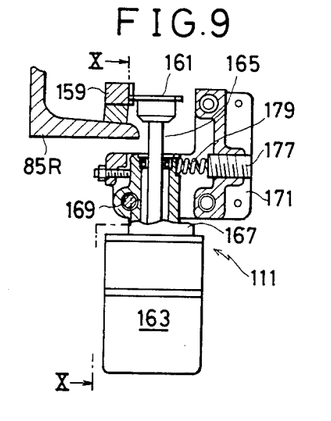
FIG. 9 is an enlarged drawing viewed in the direction of the arrow IX in FIG. 5.
Figure 10:
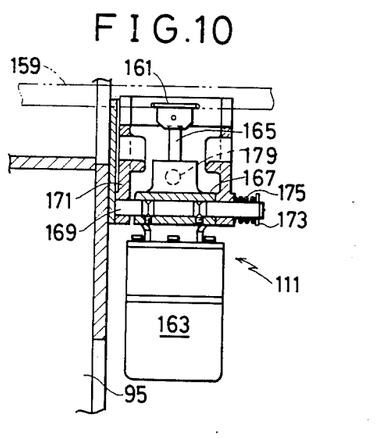
FIG. 10 is a sectional drawing viewed from along the line X—X in FIG. 9.

Once again referring to FIG. 5, and also referring to FIG. 9 and FIG. 10, the moving position detection device 111 comprises a rack 159 which is installed on one frame 85R of the roller conveyor 83, a pinion gear 161 which engages the rack 159, and a rotation detector 163 such as a pulse encoder associated with the pinion gear 161. Specifically, the rack 159 extends over the movable range in the longitudinal direction of the material feed vise device 11. The pinion gear 161 is integrally mounted on the end of a rotating shaft 165 of the rotation detection device 163. The rotation detector 163 is supported by a detector holder 167. The detector holder 167 is supported in a freely slidable manner on a detector bracket 171 by a pin 169 integrally mounted to the detector holder 167. The bracket 171 integrally mounted to the vise head 95 with a bolt or the like. An elastic member 175, such as a coil spring, is mounted between the detector bracket 171 and a ring-shaped spring seat plate 173 which is provided on the tip of the pin 169. In addition, an elastic member 179 is elastically mounted between an adjusting bolt 177, which is screwed into the detector bracket 171, and the detector holder 167, to pressure-energize or bias the pinion gear 161 in the direction of the rack 159.

From this structure, as previously explained, when the material feed vise device 11 moves in the longitudinal direction, the pinion gear 161 is engaged with the rack 159 to rotate, causing the rotation detector 163 to also rotate. Accordingly, the moving position of the material feed vise device 11 can be detected by counting the number of pulses transmitted from the rotation detector 163 in a control device. Incidentally, in this configuration, the pin 169 and the detector holder 167 are always biased in a fixed direction by the action of the elastic member 175. Thus, the holder 167 is supported such that any backlash is avoided between the holder 167 and the detector, bracket 171. In addition, the pinion gear 161 is biased toward the rack 159 from the action of the elastic member 179, so that backlash is eliminated. Accordingly, the moving position of the material feed vise device 11 can be accurately detected by the rotation detector 163. In other words, when the material feed vise device 11 retreats from its closest position to the main vise device 9, the retreat of the material feed vise device 11 is halted when the value detected by the rotation detector 163 is equivalent to a prescribed set value which was previously set on a control board or the like, so that the material feed vise device 11 can be easily halted in a set position. In addition, when the material feed vise device 11 is to be moved from the retreat position to the advance position to feed the workpiece W, it is easy to know the distance to the advance position of the material feed vise device from the retreat position.

Specifically, because a device 111 is provided to detect the moving position of the material feed vise device 11, it is always possible to know the position of the material feed vise device 11, and it is possible to halt it at a position previously set at the control device. Accordingly, the material feed vise device 11 retreats as far as a prescribed position, and by the repetition of the reciprocating movement the vice device 11 from the prescribed position to the most advanced position, fixed dimensional feeding can be carried out. In addition, the material feed vise device 11 retreats as far as the maximum retreat position, and it is possible to carry out the dimensional feed, successively advancing the vice device 11 one prescribed dimension at a time from the maximum retreat position.

Incidentally, when the material feed vise device 11 is reciprocating or when it reaches the maximum advance position from the maximum retreat position while feeding a fixed dimension, the configuration which detects and holds the rear end section of the workpiece W is possible in a following manner. Although omitted from the drawings, an appropriate sensor such as a limit switch, proximity switch, or optical element is positioned at at least one of the fixed vise jaw 113 and the movable vise jaw 131 on its rear side in the material feed vise device 11, so that the position of the workpiece W is known by this sensor. Then, when the material feed vise device 11 retreats and the sensor moves away from the end of the workpiece W, the retreat of the material feed vise device 11 is immediately halted. Afterward, the workpiece W is grasped between the fixed vise jaw 113 and the movable vise jaw 131 of the material feed vise device 11, and the final feed action of the shortened workpiece W is carried out by the advance of the material feed vise device 11.

Once more referring to FIG. 2 and FIG. 3, a front vise device 13 provided at the front position of the main vise device 9 is constructed almost the same as the previously described material feed vise device 11. Specifically, a roller conveyor 183, which supports a plurality of support rollers 181 in a freely rotatable manner, is provided in front of the main vise device 9. The rear ends of a pair of frames 185R, 185L of the roller conveyor 183 are supported on the base 3 close to the main vise device 9. The front ends of the frames 185R, 185L are supported on a stand 187 erected on the base 3.

A pair of guide bars 189, almost identical to the guide bars 93, are provided below the support rollers 181. A vise bed 191 for the front vise device 13 is supported in a freely slidable manner on the guide bars 189. In addition, a cylinder device 193 similar to the feed cylinder 97 is provided below the support roller 181 to allow reciprocating motion of the vise bed 191. The cylinder device 193 is suitably mounted on the stand 187. A piston rod 195 is suitably connected to the vise bed 191. Further, although omitted from the drawings, a moving position detection device almost identical to the moving position detection device 111 is provided on the roller conveyor 183 to detect the moving positon of the front vise device 13.

Accordingly, the front vise device 13 moves reciprocatingly in the longitudinal direction from the action of the cylinder device 193, and its moving position in the longitudinal direction is known by means of this detection device.

A fixed vise assembly 197 and a movable vise assembly 199 of a configuration identical to that of the fixed vise assembly 105 and the movable vise assembly 109 of the material feed vise device 11, are respectively mounted on one side and the other side of the vise bed 191 of the front vise device 13. A fixed vise jaw 201 on the fixed vise assembly 197, and a movable vise jaw 203 on the movable vise assembly 199 protrude in the rear direction past the cutting position CP to adequately grasp the workpiece W when the front vise device 13 is closest to the main vise device 9.

With the above configuration, the product cut from the workpiece at the cutting position CP is grasped between the fixed vise jaw 201 and the movable vise jaw 203 on the front vise device 13. In this state, the product is easily conveyed forward with the movement of the front vise device 13 in the forward direction by the action of the cylinder device 193. In addition, when the front vise device 13 is closest to the main vise device 9, the fixed vise jaw 201 and the movable vise jaw 203 protrude in the rear direction from the cutting position CP, so that it is possible to extract a remnant which has become too short. At this time, the detection means detects the moving position of the front vise device 13 from the position of furthest retreat, and when this detected value agrees with the fixed dimension material dimension, the movement of the front vise device 13 is halted. Thus, when the remnant is cut it is always shorter than the product length, making it possible to avoid waste.

Again referring to FIG. 1, a laser beam head 205 is mounted on the cutting head 7 to check whether or not the position of the cut made by the cutting tool 5 agrees with a ruled line on the workpice W. The laser beam head 205 irradiates a line of visible light such as, for example, the ray from an He-Ne laser, onto the workpiece W. A cylindrical lens 207 is mounted at the end to irradiate a sector-shaped laser beam LB. Specifically, the laser beam head 205 agrees with the vertical surface on which the cutting tool 5 moves due to the vertical motion of the cutting head 7, and the cutting head 7 is mounted on the lower section so that the laser beam LB is projected onto it.

Accordingly, the sector-shaped laser beam LB which is irradiated by the laser beam head 205 can be used to verify whether or not the positioning of the workpiece W is accurate by visually determining whether or not the section of the laser beam which is lighted in a straight line on the workpiece W agrees with the ruled line on the workpiece W.

Again referring to FIG. 1, a rotating brush device 209 for brushing off the chips which adhere to the cutting tool 5 is mounted on the lower part of one wheel housing 17 on the cutting head 7. Specifically, a rotating shaft 211, which is constructed so that it is suitably and rotatably connected to the shaft 21, is provided on the lower side of the wheel housing 17. A rotating brush 213 is mounted on the rotating shaft 211 in a freely mountable and dismountable manner.

Figure 11:
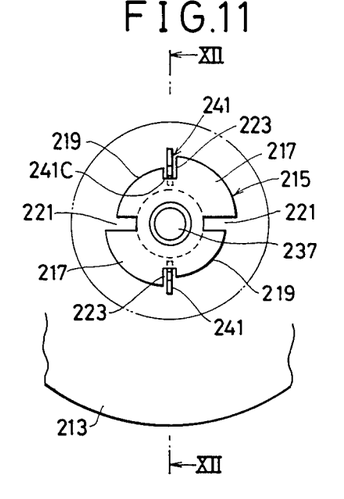
FIG. 11 is an enlarged drawing viewed in the direction of the arrow XI in FIG. 1.
Figure 12:
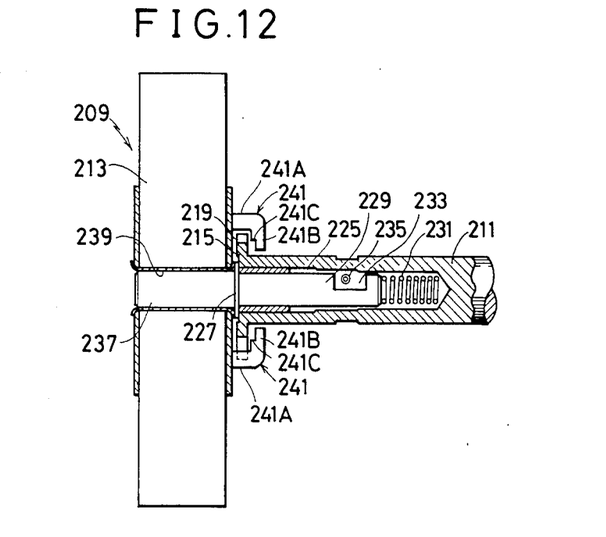
FIG. 12 is a sectional drawing viewed from along the line XII—XII in FIG. 11.

As shown in detail in FIG. 11 and FIG. 12, a flange section 215 is formed on the tip of the rotating shaft 211. A large diameter section 217 and a small diameter section 219 are alternately formed at symmetrical positions on the flange section 215. A large, deep slot 221 and a small, shallow slot 223 are formed in the centerline direction between the large diameter sections 217 and the small diameter sections 219 which are adjacent to each other. In addition, a hole 225 is formed in the axial direction in the rotating shaft 211. A support shaft 229, provided with a suitably positioned contact plate 227, engages the hole 225 in a freely slidable manner. The support shaft 229 is biased in the direction which causes it to protrude from the hole 225 by a spring 231, such as a coil spring which is interposed between the support shaft 229 and the rotating shaft 211. The support shaft 229 is prevented from coming out of the hole 225 by a stopper 235 which is fixed to the rotating shaft 211 and which penetrates a notched section 223 formed in the support shaft 229.

A pair of almost L-shaped contact or stop members 241 are provided on one end surface of the rotating brush 213, which is provided in the center section of the engaging hole 239 which is freely engaged by the protruding section 237 of the support shaft 229. The contact or stop members 241 are provided on one end surface of the rotating brush 213 at a postion substantially equivalent to the diameter of the flange section 215 of the rotating shaft 211. The almost L-shaped members 241 each comprise an axially protruding section 241A, which protrudes in the axial direction parallel to the center of the shaft of the rotating brush 213, and a radially protruding section 241B which protrudes in the inward radial direction from the tip of the axially protruding section 241A.

The radially protruding section 241B is formed long enough to be able to pass through the large slot 221 in the flange 215 provided in the rotating shaft 211, but not through the small slot 223. This radially protruding section 241B has a stepped section 241C formed on a side section opposed to the rotating brush 213. The stepped section 241C can engage the small slot 223 in the flange section 215. However, it is constructed so that movement in the direction of rotation is prevented by the small diameter section 219 of the flange section 215.

With the above type of configuration, in mounting the rotating brush 213 on the rotating shaft 211, first, the position of the contact member 241 of the rotating brush 213 is matched with the position of the large slot 221 in the flange section 215 formed in the rotating shaft 211. Then, the rotating brush 213 makes contact with the contact plate 227 on the support shaft 229 and is pressed against the spring 231, so that the radially protruding section 241B of the contact or stop member 241 passes through a part of the large slot 221. In the above manner, after the radially protruding section 241B passes through a part of the large slot 221, the rotating brush 213 rotates relative to the rotating shaft 211. The contact or stop member 241 is positioned at the position of the small slot 223 of the flange section 215, and when the rotating brush 213 is released, the rotating brush 213 etc. are returned slightly to the left in FIG. 12 by the action of the spring 231. Specifically, the radially inward projecting section 241B contacts the flange section 215, and the stepped section 241C is engaged in the small slot 223.

Accordingly, as well as preventing the dismounting of the rotating brush 213 from the rotating shaft 211, free rotation in the direction of rotation is also prevented. In the above manner, after the rotating brush 213 is mounted on the rotating shaft 211, when the rotating shaft 211 rotates in the counter-clockwise direction in FIG. 11 the large diameter section 217 of the flange section 215 contacts the axially protruding section 241A of the contact or stop member 241, and the rotating brush 213 is caused to rotate. At this time, even in the case where the rotation and halting of the rotating shaft 211 are repeated, the rotating brush 213 does not rotate in relation to the rotating shaft 211. In addition, the rotating brush 213 is not dismounted from the rotating shaft 211.

In the case where the rotating brush 213 is dismounted from the rotating shaft 211, first, the rotating brush 213 is pressed against the spring 231, and the engagement between the small slot 223 of the flange section 215 and the stepped section 241C of the contact or stop member 241 is released. Next, the rotating brush 213 is caused to rotate in relation to the rotating shaft 211, and by positioning the contact or stop member 241 in the position of the large slot 221 of the flange section 215, the rotating brush 213 can be easily dismounted from the rotating shaft 211.

Specifically, by means of this embodiment of the present invention, it is easy to remove the rotating brush 213 from the rotating shaft 211 and exchange it, without the use of any tools or the like.

Figure 13:
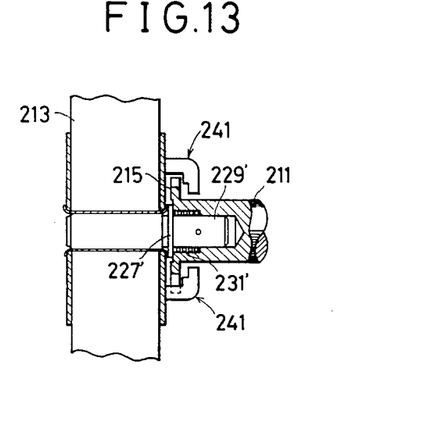
FIG. 13 is an explanatory drawing of another embodiment of the present invention showing a sectional view in the same way as in FIG. 12.

Further, in order to maintain the engagement of the flange section 215 of the rotating shaft 211 and the contact member 241 of the rotating brush 213, as an energizing device to bias the rotating brush 213 in the direction for dismounting, for this embodiment of the present invention, the foregoing explanation was of the configuration for biasing the support shaft 229 by the spring 231. However, in place of the above configuration, as shown in FIG. 13, it is also possible to have the configuration wherein, for example, a contact plate 227' is provided freely slidable in the axial direction of the support shaft 229', and this contact plate 227' is biased by a spring 231'. In addition, although details have been omitted from the drawings, conversely to the above explanation, in order to carry out the relative action, it is possible to have the configuration wherein both a member corresponding to the contact plate and a spring are mounted on the rotating brush side.

As can be readily understood from the above explanation of this embodiment of the present invention, even in the case wherein the workpiece is so short that the feed action by the material feed vise device of the main vise device is difficult, if the length of the workpiece is longer than that of the product, the product can be cut from the workpiece and it is possible to reduce the waste of the remnant.

In addition, the fixed vise assembly in the material feed vise device can be made compact, and the external appearance is improved. Also, the hydraulic pressure circuits are not exposed externally, so that damage to the hydraulic mechanism from external factors is prevented.

Further, when the rigidity of the movable vise assembly in the material feed vise device is improved, no modifications need to be made in the hydraulic cylinder and the like for activating the movable vise assembly, and the rigidity can easily be heightened.

In addition, it is possible to accurately detect the moving position of the material feed vise device, and setting the feed dimension for feeding a fixed dimension is made easy.

Also, when the feed vise device comes close to the main vise device, there is no hindrance from a sub guide post, and it is possible to come very close. Further, the mounting seat of the sub guide post can be machined at the same time as the vise bed, which is a simple process.

Because the lower limit of the cutting head can be changed to correspond to the width of the cut workpiece, the cutting head never descends lower than necessary, so the operating efficiency is improved.

Further, the mounting and dismounting required to replace disposable items, such as a rotating brush, can be easily performed without the use of tools.

Althoug only preferred embodiments are specifically illustrated and described herein, it will be apprectiated that many modifications and variations of the presnt invention are possible in light of the above teachings and within the purview of the appended claims without departing from the spirit and intended scope of the invention.

What is claimed is:

1. A cutting apparatus comprising:
   a base;
   a cutting head provided in a freely elevatable manner on the base;
   a cutting tool mounted on the cutting head for cutting a workpiece;

a main vise device for grasping and securing the workpiece, positioned on the rear side of a cutting position where the cutting of a workpiece is performed, the main vise device having a vise bed, a fixed vise jaw mounted on one side of the vise bed, and a movable vise jaw mounted on the other side of the vise bed for grasping the workpiece in cooperation with the fixed vise jaw;

a lower limit detection device provided on one of the base and the cutting head to detect the lower limit of the cutting head; and a lower limit setting device, provided on the other of the base and the cutting head, for activating the lower limit detection device to regulate the lower limit of the cutting head, the lower limit of the cutting head being determined by the lower limit detection device detecting the lower limit setting device;

wherein the lower limit detection device or the lower limit setting device on the base side is connected to the movable vise jaw for movement so that the position of the lower limit detection device or the lower limit setting device on the base side is changed in accordance with the width of the workpiece.

2. The cutting apparatus of claim 1, wherein the lower limit detection device is provided on the cutting head side, and the lower limit setting device provided on the base side is displaced in the vertical direction in correspondence with the movement of the movable vise jaw.

3. A cutting apparatus comprising:

a base;

a cutting head provided in a freely elevatable manner on the base;

a cutting tool mounted on the cutting head for cutting a workpiece;

a main vise device for grasping and securing the workpiece, positioned on the rear side of a cutting position where the cutting of a workpiece is performed, the main vise device having a vise bed, a fixed vise jaw mounted on one side of the vise bed, and a movable vise jaw mounted on the other side of the vise bed for grasping the workpiece in cooperation with the fixed vise jaw;

a lower limit detection device provided on one of the base and the cutting heads to detect the lower limit of the cutting head; and a lower limit setting device, provided on the other of the base and the cutting head, for activating the lower limit detection device to regulate the lower limit of the cutting head, the lower limit of the cutting head being determined by the lower limit detection device detecting the lower limit setting device;

wherein the lower limit detection device or the lower limit setting device on the base side is connected to the movable vise jaw for movement so that the position of the lower limit detection device or the lower limit setting device on the base side is changed in accordance with the width of the workpiece;

wherein the lower limit detection device is provided on the cutting head side, and the lower limit setting device provided on the base side is displaced in the vertical direction in correspondence with the movement of the movable vise jaw; and wherein the lower limit setting device provided on the base side comprises:

a threaded rod vertically provided in a freely rotatable manner; and a nut member which is screwed onto the threaded rod for vertical motion;

wherein the threaded rod is associated with the movable vice jaw through a rack and pinion gear means.

* * * * *